(12) United States Patent
Sun et al.

(10) Patent No.: US 11,313,302 B1
(45) Date of Patent: Apr. 26, 2022

(54) ENGINE IDLE SPEED OPTIMIZATION

(71) Applicants: Hyundai Motor Company, Seoul (KR); Kia Corporation, Seoul (KR)

(72) Inventors: Yong Sun, Ann Arbor, MI (US); Jinho Ha, Seoul (KR); Jason Hoon Lee, Ann Arbor, MI (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/368,036

(22) Filed: Jul. 6, 2021

(51) Int. Cl.
*F02D 41/08* (2006.01)
*F02D 31/00* (2006.01)
*F02D 41/22* (2006.01)

(52) U.S. Cl.
CPC ......... *F02D 41/083* (2013.01); *F02D 31/008* (2013.01); *F02D 41/22* (2013.01); *F02D 2200/101* (2013.01)

(58) Field of Classification Search
CPC ...... F02D 41/083; F02D 31/008; F02D 41/22; F02D 2200/101
See application file for complete search history.

(56) References Cited

U.S. PATENT DOCUMENTS

| | | | | |
|---|---|---|---|---|
| 3,554,170 | A * | 1/1971 | Schenk | F02D 3/02 123/305 |
| 6,176,218 | B1 * | 1/2001 | Beechie | F02D 31/008 123/339.19 |
| 6,188,951 | B1 * | 2/2001 | Beechie | G01M 15/042 701/102 |
| 6,553,958 | B1 * | 4/2003 | Kolmanovsky | F02D 41/1402 123/295 |
| 6,655,353 | B1 * | 12/2003 | Rayl | F02D 17/02 123/198 F |
| 7,054,738 | B1 | 5/2006 | Stotsky | |
| 7,324,888 | B1 * | 1/2008 | Stotsky | F02D 41/123 701/101 |
| 7,349,795 | B2 * | 3/2008 | Urano | G01M 15/05 701/113 |
| 7,650,220 | B2 * | 1/2010 | Marszalek | F02D 41/28 701/102 |
| 7,861,688 | B2 * | 1/2011 | Kubonoya | F02D 31/003 123/339.12 |
| 7,991,537 | B2 * | 8/2011 | Halleberg | F02D 41/2467 701/104 |
| 8,437,927 | B2 * | 5/2013 | Brennan | F02D 41/1497 701/51 |

(Continued)

FOREIGN PATENT DOCUMENTS

| KR | 10-2008-0083708 A | 9/2008 |
|---|---|---|
| KR | 10-2009-0092323 A | 8/2009 |
| KR | 10-2016-0098078 A | 8/2016 |

*Primary Examiner* — Joseph J Dallo
(74) *Attorney, Agent, or Firm* — Mintz Levin Cohn Ferris Glovsky and Popeo, P.C.; Peter F. Corless

(57) ABSTRACT

Methods and systems are described for engine idle speed optimization. A system may include determining whether a fuel intake rate indicative of an amount of fuel consumed by an idling engine over time satisfies a threshold in comparison to a reference fuel intake rate. The reference fuel intake rate may be indicative of a predetermined amount of fuel consumed by the idling engine over time. The system may adjust a predetermined minimum speed at which the engine idles in response to determining that the fuel intake rate satisfies the threshold.

20 Claims, 8 Drawing Sheets

(56) References Cited

U.S. PATENT DOCUMENTS

| | | | | |
|---|---|---|---|---|
| 8,602,001 | B2* | 12/2013 | Kaiser | F02D 41/1497 |
| | | | | 123/350 |
| 9,745,908 | B2* | 8/2017 | Lucht | F02D 29/06 |
| 9,914,450 | B2* | 3/2018 | Ahn | B60K 6/48 |
| 10,108,197 | B2* | 10/2018 | Lauffer | G08G 1/161 |
| 10,202,144 | B2* | 2/2019 | Brown | G05D 1/0255 |
| 2003/0100401 | A1* | 5/2003 | Kim | F02D 41/023 |
| | | | | 477/107 |
| 2003/0183203 | A1* | 10/2003 | Unland | F02P 5/1525 |
| | | | | 123/486 |
| 2004/0068359 | A1* | 4/2004 | Neiss | B60W 50/0097 |
| | | | | 701/96 |
| 2004/0161340 | A1* | 8/2004 | Rimkus | F04B 49/20 |
| | | | | 417/20 |

* cited by examiner

ENGINE IDLE SPEED OPTIMIZATION

TECHNICAL FIELD

The present disclosure relates generally to engines, and more particularly, to engine idle speed optimization.

BACKGROUND

To prevent the vehicle from stalling, an engine may idle at a certain engine speed. Idling engines consume fuel but do not propel the vehicle, decreasing the efficiency of the vehicle. Higher idling engine speeds consume more fuel than lower idling engine speeds. Higher idling engine speeds may be necessary under high engine friction conditions. Engine friction can vary with oil temperature, mileage accumulation, oil change, and other engine conditions. Currently, calibration engineers typically set high engine idling speeds based on the highest possible friction in the engine to avoid engine stalling problems.

SUMMARY

The present disclosure provides methods, systems, articles of manufacture, including computer program products, for engine idle speed optimization.

In one aspect, there is provided a system including at least one processor and at least one memory. The at least one memory may store instructions. When executed by the at least one data processor, the instructions may cause the at least one data processor to at least: determining whether a fuel intake rate indicative of an amount of fuel consumed by an idling engine over time satisfies a threshold in comparison to a reference fuel intake rate. The reference fuel intake rate may be indicative of a predetermined amount of fuel consumed by the idling engine over time. The system may adjust a predetermined minimum speed at which the engine idles in response to determining that the fuel intake rate satisfies the threshold.

In some variations, one or more of the features disclosed herein including the following features can optionally be included in any feasible combination. In some implementations, the reference fuel intake rate corresponds to the predetermined minimum speed at which the engine idles to at least prevent the idling engine from stalling, the fuel intake rate corresponds to a speed at which the engine idles, and the speed at which the engine idles is determined by a crankshaft position sensor communicatively coupled to the processor. In some implementations, the idling engine is isolated from all external load factors, and wherein the adjusting of the predetermined minimum speed at which the engine idles is based on a difference between the fuel intake rate and the reference fuel intake rate. In some implementations, the reference fuel intake rate is stored in an engine map, the engine map including information relating to a set of engine parameters and an internal friction of the idling engine. The operations may further comprise updating the reference fuel intake rate stored in the engine map that corresponds to the adjusted predetermined minimum speed, wherein the reference fuel intake rate is based on the set of engine parameters, and the internal friction of the idling engine.

The operations may further comprise estimating, in response to determining that the fuel intake rate satisfies the threshold, an internal friction of the idling engine based on a set of engine parameters; and adjusting the predetermined minimum speed at which the engine idles based on the estimated internal friction of the idling engine. In some implementations, the set of engine parameters includes at least one of oil temperature, oil quality, age of engine components, time since engine break in, torque, engine design, and engine speed. In some implementations, the internal friction of the idling engine is stored in an engine map, and wherein estimating the internal friction of the idling engine is further based on a difference between the fuel intake rate and the reference fuel intake rate. The operations may further comprise updating, in response to estimating the internal friction of the idling engine based on the set of engine parameters, the internal friction of the idling engine stored in the engine map.

In another aspect, there is provided a system including at least one processor and at least one memory. The at least one memory may store instructions. When executed by the at least one data processor, the instructions may cause the at least one data processor to at least: determining, in response to cutting fuel to an engine and the engine being isolated from a drivetrain load, whether a rate of decreasing engine speed over time satisfies a threshold in comparison to a reference rate of decreasing engine speed over time; and adjusting a predetermined minimum speed at which the engine idles to prevent the engine from stalling in response to determining that the rate of decreasing engine speed over time satisfies the threshold.

In some variations, one or more of the features disclosed herein including the following features can optionally be included in any feasible combination. In some implementations, the reference rate of decreasing engine speed over time is based on a time interval necessary for the engine to reach an engine speed of zero, the time interval measured from cutting the fuel to the engine and the engine being isolated from the drivetrain load to the engine speed reaching zero. In some implementations, the reference rate of decreasing engine speed over time is based on a time interval necessary for the engine to reach the predetermined minimum speed at which the engine idles, the time interval measured from cutting the fuel to the engine and the engine being isolated from the drivetrain load to an engine speed reaching the predetermined minimum speed at which the engine idles. In some implementations, the rate of decreasing engine speed over time is determined by a crankshaft position sensor communicatively coupled to the processor, and wherein the adjusting the predetermined minimum speed at which the engine idles is based on a difference between the rate of decreasing engine speed over time and the reference rate of decreasing engine speed over time. In some implementations, the reference rate of decreasing engine speed over time is stored in an engine map, the engine map including information relating to a set of engine parameters and an internal friction of the engine.

The operations may further comprise updating the reference rate of decreasing engine speed over time stored in the engine map that corresponds to the adjusted predetermined minimum speed, wherein the reference rate of decreasing engine speed over time is based on the set of engine parameters, and the internal friction of the engine. The operations may further comprise estimating, in response to determining that the rate of decreasing engine speed over time satisfies the threshold, an internal friction of the engine based on a set of engine parameters; and adjusting the predetermined minimum speed at which the engine idles based on the estimated internal friction of the engine. In some implementations, the set of engine parameters includes at least one of oil temperature, oil quality, age of engine components, time since engine break in, torque, engine design, and engine speed. In some implementations, the internal friction of the engine is stored in an engine map, and wherein estimating the internal friction of the engine is further based on a difference between the rate of decreasing engine speed over time and the reference rate of decreasing engine speed over time. The operations may further comprise updating, in response to estimating the internal friction of the engine based on the set of engine parameters, the internal friction of the engine stored in the engine map.

Implementations of the current subject matter may include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
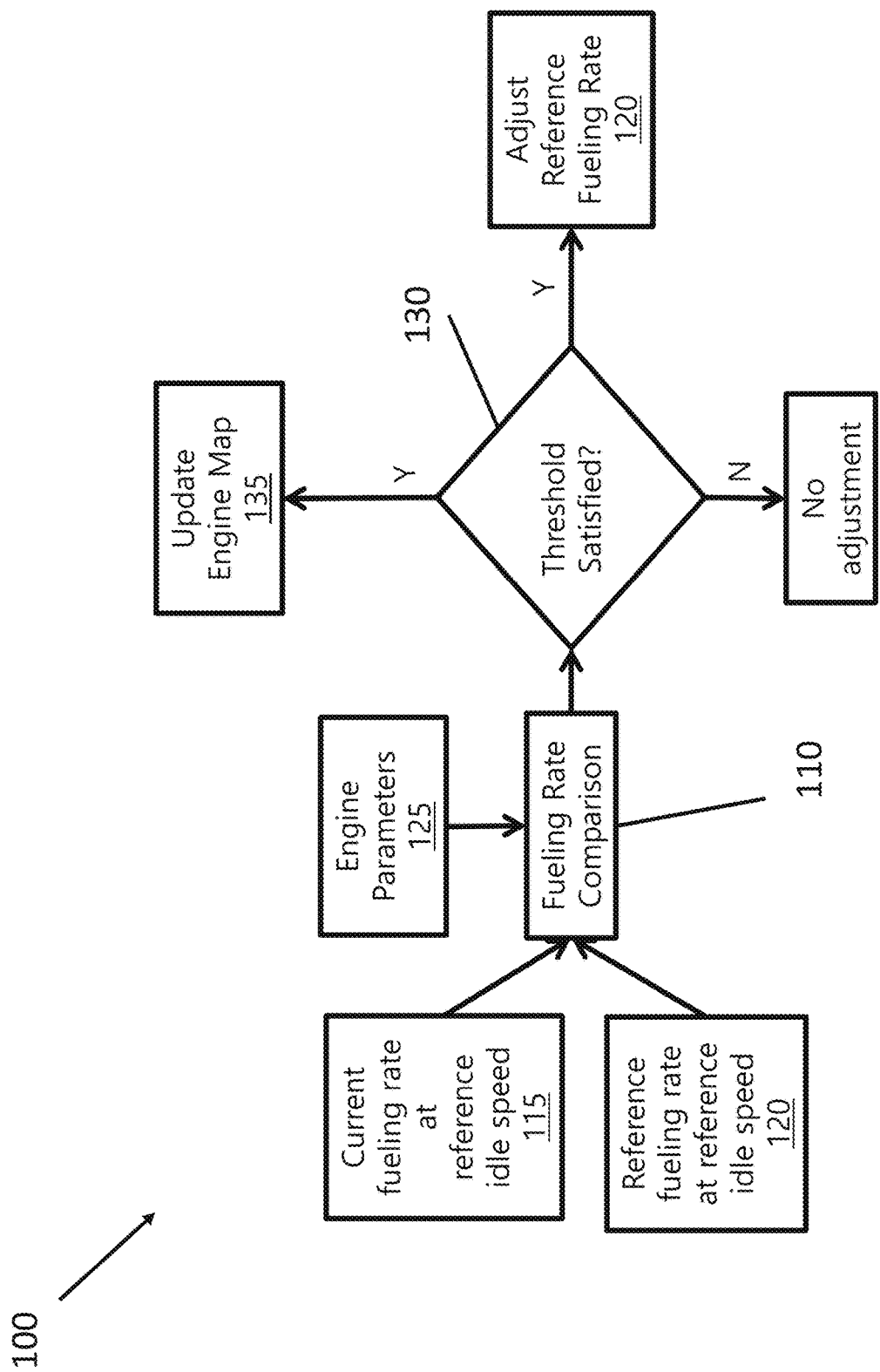
FIG. 1 depicts a flowchart illustrating an example of a process for controlling the target idle speed of an idling engine and updating a friction torque map in a vehicle based on a fueling rate.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The idling engine speed may be optimized to consume the least amount of fuel required to prevent stalling. The optimal idling engine speed may be achieved by evaluating the fuel intake rate during idle and adjusting the target engine idle speed. The optimal idling engine speed may be achieved by evaluating the rate of decreasing engine speed while the engine is neutral. The optimal idling engine speed may be based on internal friction of the idling engine. Estimating internal friction of the idling engine may factor in various engine parameters to adjust engine idle speed dynamically. The idling engine speed may dynamically change to accommodate all lifetime stages of the vehicle. By adjusting idle speed dynamically, vehicle fuel economy can be improved.

FIG. 1 depicts a flowchart illustrating an example of a process for controlling the target idle speed of an idling engine and updating a friction torque map in a vehicle based on a fueling rate. The target idle speed flowchart 100 may determine whether the target fuel intake rate at engine idle may be reduced by comparing the current fuel intake rate 115 and the reference fuel intake rate 120. The internal engine friction may be determined based on the difference between the current fuel intake rate 115 and the reference fuel intake rate 120. If the difference between the current fuel intake rate 115 and the reference fuel intake rate 120 satisfies a threshold, an engine map 135, such as an engine friction map, is updated and the reference fuel intake rate 120 is adjusted.

At 110, the fuel intake rate 115 and the reference fuel intake rate 120 may be compared. The comparison may take a difference between the fuel intake rate 115 and the reference fuel intake rate 120. The fuel intake rate 115 may be indicative of an amount of fuel consumed by the idling engine 105 over time. The fuel intake rate 115 may be determined by the engine control unit or an electronic control unit.

The engine control unit or an electronic control unit may measure the amount of fuel the idling engine 105 is consuming based on engine speed or rotations per minute of the idling engine 105. The engine speed or rotations per minute of the idling engine 105 may be calculated based on readings from a crankshaft position sensor. The fuel intake rate 115 may correspond to a speed at which the engine idles. The crankshaft position sensor may be communicatively coupled to the engine control unit, the electronic control unit, and/or another processor.

The reference fuel intake rate 120 may be stored in an engine map 135. The reference fuel intake rate 120 may be indicative of a predetermined amount of fuel consumed by the idling engine 105 over time. The reference fuel intake rate 120 may correspond to the predetermined minimum speed at which the engine idles to at least prevent the idling engine 105 from stalling. The reference fuel intake rate 120 may be sufficiently slow to prevent the excess use of fuel while also preventing the idling engine 105 from stalling.

The reference fuel intake rate 120 may be determined by the internal friction of the idling engine 105. Internal engine friction may depend on engine parameters 125, such as engine design, engine speed, indicated torque, oil temperature, oil quality, time interval since last oil change, age of engine components, initial break-in, and/or the like. The fuel intake rate 115 necessary to avoid stalling may change when internal friction changes due to the engine parameters 125. That is, the reference fuel intake rate 120 may change as the internal friction of the idling engine 105 changes. Accordingly, the reference fuel intake rate 120 may be used to assess engine friction change.

The internal friction of the idling engine 105 may be estimated based on a difference between the fuel intake rate 115 and the reference fuel intake rate 120. The comparison between the fuel intake rate 115 and the reference fuel intake rate 120 may determine a change over time in internal friction of the idling engine 105. The amount that the internal friction changes may be determined by measuring or estimating the internal friction of the idling engine 105. Furthermore, adjusting the target idle speed for the idling engine 105 and the engine map 135 may be based on the internal friction of the idling engine 105.

To ensure the accurate measurement of the fuel intake rate 115, the reference fuel intake rate 120, and the internal friction of the idling engine 105, the engine must be isolated from all external load factors. Road load factors such as wind, road grade, and the like need to be isolated to assess engine friction change. Engine idle during a vehicle stop or while the vehicle is in park may constitute ideal times to assess engine friction without the external influences. The vehicle may be in neutral or idle in gear while performing a fuel intake rate comparison. During idle, no drivetrain loss or road load occurs. With all external loads removed, only some torque converter friction applies to the idling engine 105. Fueling rate comparisons may occur at every engine idle, every trip, certain time interval, or certain mileage interval, and/or the like.

At 130, the fueling rate comparison may be used to determine whether a threshold is satisfied. In some embodiments, the difference between the fuel intake rate 115 and the reference fuel intake rate 120 satisfies a threshold. In some embodiments, the fuel intake rate 115 satisfies a threshold. If the difference between fuel intake rate 115 at reference idle speed and reference fuel intake rate 120 exceeds a preset threshold, the predetermined minimum speed at which the engine idles may be corrected. A predetermined minimum speed at which the engine idles may be adjusted in response to determining that the fuel intake rate 115 satisfies the threshold. If the difference falls below the threshold, a correction may not be necessary.

The predetermined minimum speed may correspond to the reference fuel intake rate 120. The predetermined minimum speed may determine the reference fuel intake rate 120 during subsequent idles. The idling engine 105 may operate at the predetermined minimum speed during subsequent idle conditions after updating the predetermined minimum speed. The magnitude of the adjustment of the predetermined minimum speed at which the engine idles may be based on a difference between the fuel intake rate 115 and the reference fuel intake rate 120.

Additionally, the internal friction of the idling engine 105 may be estimated in response to determining that the difference between the fuel intake rate 115 and the reference fuel intake rate 120 satisfies a threshold. The predetermined minimum speed at which the engine idles may be adjusted based on the estimated internal friction of the idling engine 105. The internal friction of the idling engine 105 may be stored in the engine map 135. The internal friction of the idling engine 105 may be further estimated based on a set of engine parameters 125. The engine parameters 125 may include engine design, engine speed, indicated torque, oil temperature, oil quality, time interval since last oil change, age of engine components, initial break-in, and/or the like.

An engine map 135 may be a prefilled engine map. A prefilled engine map may store the correlation of idle fueling rate difference between the fuel intake rate 115 and the reference fuel intake rate 120 and the amount of correction to the ideal idle speed. The prefilled engine map may also store friction loss as a range of percentages of total fuel energy under idle. This prefilled engine map may be used to estimate engine friction difference from a reference engine friction. Additionally, reference idle speeds and fueling rates may be stored in prefilled engine maps. Prefilled engine maps may include idle fueling information and may be used to correct the engine map 135 under wide engine operating conditions.

The engine map 135 may store the reference fuel intake rate 120. The reference fuel intake rate 120 stored in the engine map 135 may be updated. The reference fuel intake rate 120 stored in the engine map 135 may be updated to correspond to the adjusted predetermined minimum speed. The reference fuel intake rate 120 stored in the engine map 135 may be updated in response to satisfying the threshold. The reference fuel intake rate 120 may be based on the set of engine parameters 125 and/or the internal friction of the idling engine 105. The internal friction of the idling engine 105 may be stored in the engine map 135. The internal friction of the idling engine 105 stored in the engine map 135 may be updated in response to estimating the internal friction of the idling engine 105 based on the set of engine parameters 125. The engine map 135 may also include information relating to a set of engine parameters 125 and an internal friction of the idling engine 105.

Figure 2A:
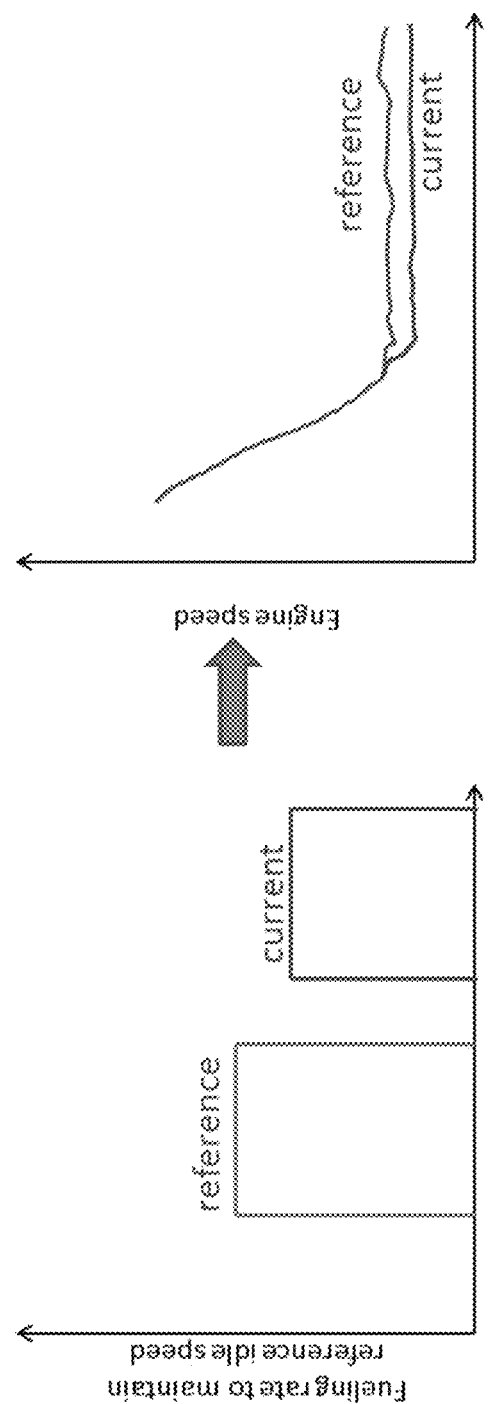
FIG. 2A depicts a diagram of an example of a fuel intake rate being lower than a reference fueling rate to maintain an engine idle speed.

FIG. 2A depicts a diagram of an example of a fuel intake rate being lower than a reference fueling rate to maintain an engine idle speed. Low internal friction is indicated by the fuel intake rate 115 necessary to maintain the reference idle speed being lower than the reference fuel intake rate 120. The target idle speed is adjusted to a lower level accordingly to save fuel. That is, the predetermined minimum speed to prevent stalling is adjusted to a lower level accordingly to save fuel. When internal friction changes, the fuel intake rate 115 needed to maintain the predetermined minimum speed changes too. The amount of correction to idle speed or friction torque can be determined from the engine map 135.

Figure 2B:
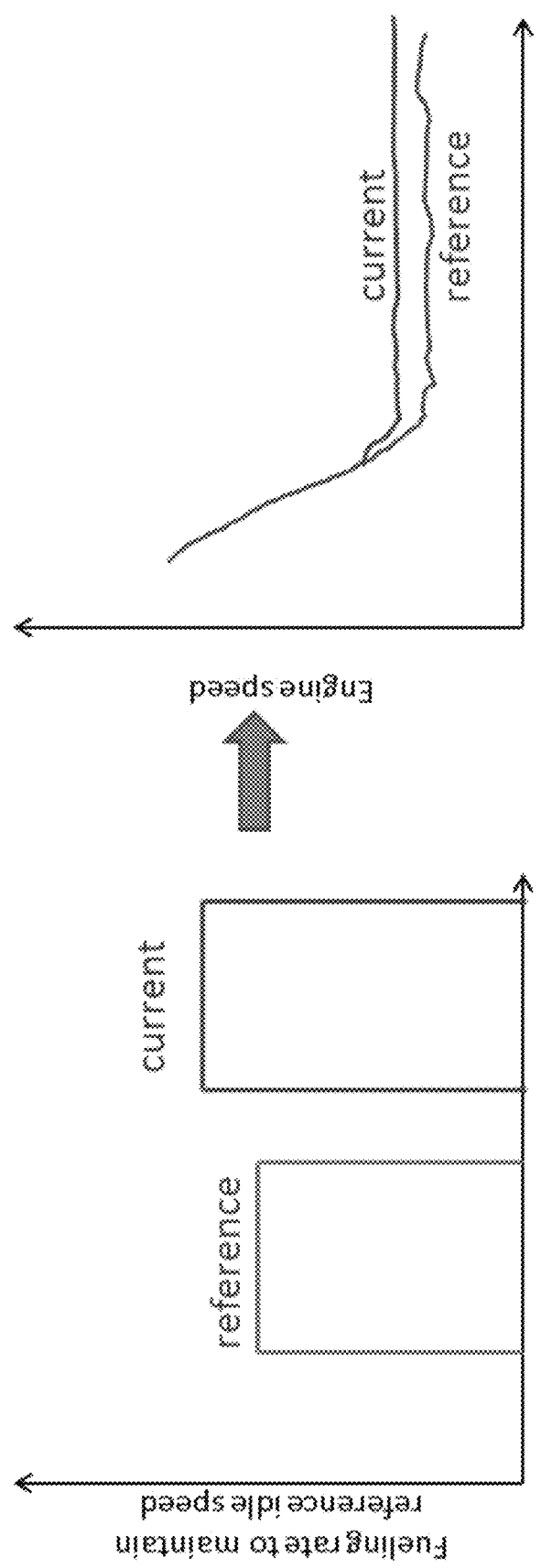
FIG. 2B depicts a diagram of an example of a fuel intake rate being higher than a reference fueling rate to maintain an engine idle speed.

FIG. 2B depicts a diagram of an example of a fuel intake rate being higher than a reference fueling rate to maintain an engine idle speed. High internal friction is indicated by the fuel intake rate 115 necessary to maintain the reference idle speed being lower than the reference fuel intake rate 120. The target idle speed is adjusted to a higher level to prevent stalling in accordance with the higher internal friction. That is, the predetermined minimum speed to prevent stalling is adjusted to a higher level. When internal friction changes, the fuel intake rate 115 needed to maintain the predetermined minimum speed changes too. The amount of correction to idle speed or friction torque can be determined from the engine map 135.

Figure 3:
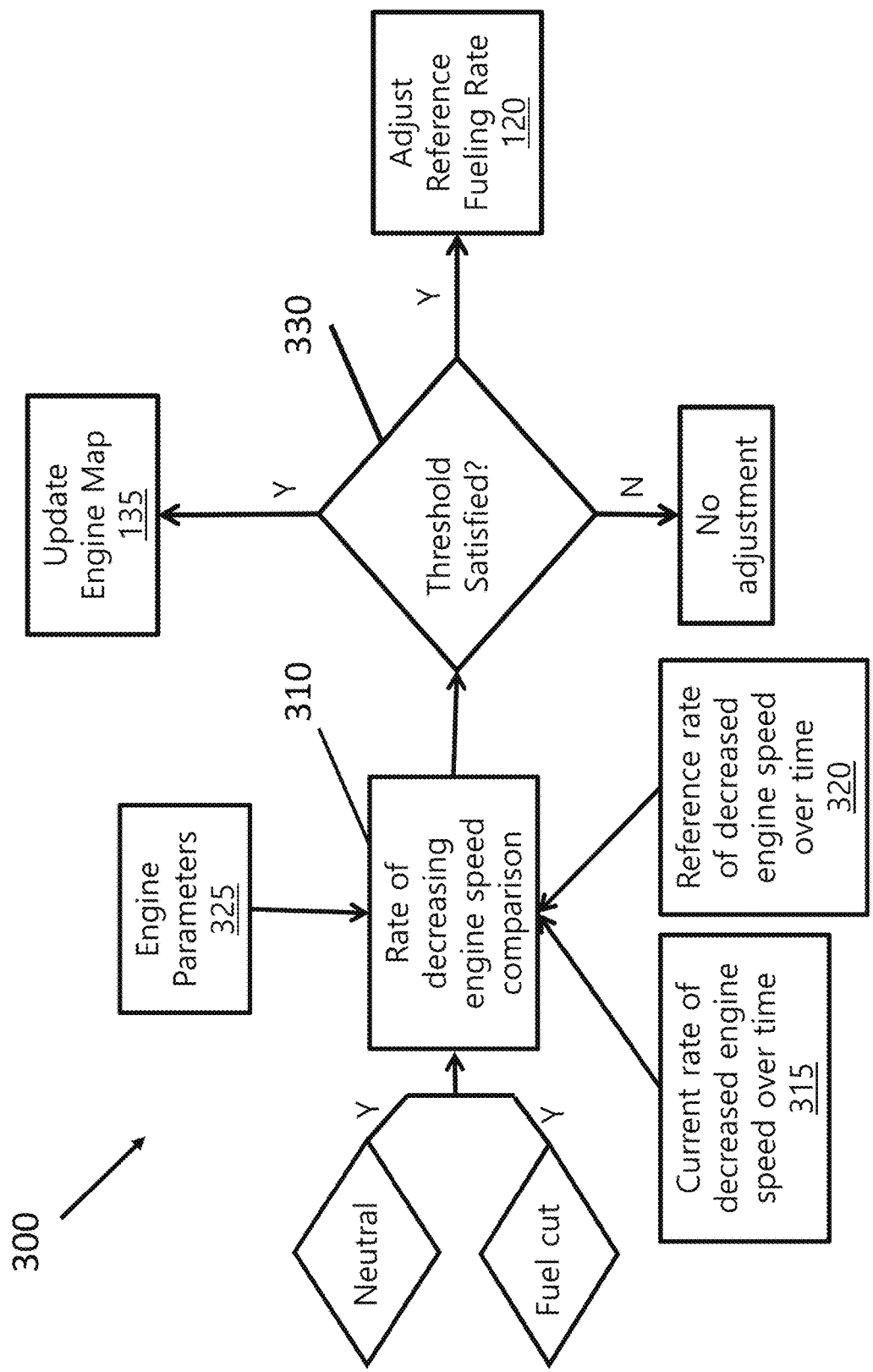
FIG. 3 depicts a flowchart illustrating an example of a process for controlling the target idle speed of an idling engine and updating a friction torque map in a vehicle based on a rate of decreasing engine speed over time.

FIG. 3 depicts a flowchart illustrating an example of a process for controlling the target idle speed of an idling engine and updating a friction torque map in a vehicle based on a rate of decreasing engine speed over time. The target idle speed flowchart 300 may determine whether the target fuel intake rate at engine idle may be reduced by comparing the current rate of decreasing engine speed 315 and the reference rate of decreasing engine speed 320. The internal engine friction may be determined based on the difference between the current rate of decreasing engine speed 315 and the reference rate of decreasing engine speed 320. If the difference between the current rate of decreasing engine speed 315 and the reference rate of decreasing engine speed 320 satisfies a threshold, an engine map 135, such as an engine friction map, is updated and the reference fuel intake rate 120 is adjusted.

At 310, the current rate of decreasing engine speed 315 and the reference rate of decreasing engine speed 320 may be compared. The comparison may take a difference between the current rate of decreasing engine speed 315 and the reference rate of decreasing engine speed 320. The current rate of decreasing engine speed 315 may be indicative of how quickly the engine speed decreases in response to cutting fuel to an engine and the engine being isolated from a drivetrain load. Cutting fuel to the engine may include not applying the accelerator after a period of applying the accelerator. Cutting fuel to the engine may include turning off the engine. The engine may be isolated from the drivetrain load when the vehicle is in neutral. The engine may be isolated from the drivetrain load when the vehicle is engine idle coasting or engine off coasting. The current rate of decreasing engine speed 315 may be determined by the engine control unit or an electronic control unit.

The engine control unit or an electronic control unit may measure the rate at which the engine speed decreases. The engine control unit or an electronic control unit may measure the amount of fuel the idling engine 105 is consuming based on engine speed or rotations per minute of the idling engine 105. The engine speed or rotations per minute of the idling engine 105 may be calculated based on readings from a crankshaft position sensor. The crankshaft position sensor may be communicatively coupled to the engine control unit, the electronic control unit, and/or another processor.

The reference rate of decreasing engine speed 320 may be stored in an engine map 135. The reference rate of decreasing engine speed 320 may be indicative of an expected decrease in engine speed with fuel cut to the engine and the engine being isolated from the drivetrain load. The reference rate of decreasing engine speed 320 may be indicative of an internal friction of the idling engine 105. Internal engine friction may depend on engine parameters 125, such as engine design, engine speed, indicated torque, oil temperature, oil quality, time interval since last oil change, age of engine components, initial break-in, and/or the like. The current rate of decreasing engine speed 315 may change when internal friction changes due to the engine parameters 125. That is, the reference rate of decreasing engine speed 320 may change as the internal friction of the idling engine 105 changes.

In some embodiments, the reference rate of decreasing engine speed 320 may be based on a time interval necessary for the engine to reach an engine speed of zero. The time interval may be measured from the time of cutting the fuel to the engine and the engine being isolated from the drivetrain load to the time the engine speed reaches zero. In some embodiments, the reference rate of decreasing engine speed 320 may be based on a time interval necessary for the engine to reach the predetermined minimum speed at which the engine idles. The time interval may be measured from the time of cutting the fuel to the engine and the engine being isolated from the drivetrain load to the time the engine speed reaches the predetermined minimum speed at which the engine idles. Accordingly, the reference rate of decreasing engine speed 320 may be used to assess engine friction change.

The internal friction of the idling engine 105 may be estimated based on a difference between the current rate of decreasing engine speed 315 and the reference rate of decreasing engine speed 320. The comparison between the current rate of decreasing engine speed 315 and the reference rate of decreasing engine speed 320 may determine a change over time in internal friction of the idling engine 105. The amount that the internal friction changes may be determined by measuring or estimating the internal friction of the idling engine 105. Furthermore, adjusting the target idle speed for the idling engine 105 and the engine map 135 may be based on the internal friction of the idling engine 105.

The engine must be isolated from all external load factors to accurately measure the current rate of decreasing engine speed 315, the reference rate of decreasing engine speed 320, and the internal friction of the idling engine 105. Engine isolation from external load factors may be achieved by fuel cut off and the transmission in neutral. The fuel may be cut off and the transmission is in neutral during engine idle coasting or engine off coasting. Road load factors such as wind, road grade, and the like may need to be isolated to assess engine friction change. With all external loads removed, only some torque converter friction applies to the idling engine 105. Rate of decreasing engine speed comparisons may occur at every engine idle, every trip, certain time interval, or certain mileage interval, and/or the like.

At 330, the rate of decreasing engine speed comparison may be used to determine whether a threshold is satisfied. In some embodiments, the difference between the current rate of decreasing engine speed 315 and the reference rate of decreasing engine speed 320 satisfies a threshold. In some embodiments, the current rate of decreasing engine speed 315 satisfies a threshold. If the difference between the current rate of decreasing engine speed 315 at reference idle speed and the reference rate of decreasing engine speed 320 exceeds a preset threshold, a correction to the predetermined minimum speed at which the engine idles may be adjusted. A predetermined minimum speed at which the engine idles may be adjusted in response to determining that the difference satisfies the threshold. If the difference falls below the threshold, a correction may not be necessary.

The predetermined minimum speed may correspond to the reference rate of decreasing engine speed 320. The predetermined minimum speed may determine the reference rate of decreasing engine speed 320 during subsequent idles. The idling engine 105 may operate at the predetermined minimum speed during subsequent idle conditions after updating the predetermined minimum speed. The magnitude of the adjustment of the predetermined minimum speed at which the engine idles may be based on a difference between the current rate of decreasing engine speed 315 and the reference rate of decreasing engine speed 320.

Additionally, the internal friction of the idling engine 105 may be estimated in response to determining that the difference between the current rate of decreasing engine speed 315 and the reference rate of decreasing engine speed 320 satisfies a threshold. The predetermined minimum speed at which the engine idles may be adjusted based on the estimated internal friction of the idling engine 105. The internal friction of the idling engine 105 may be stored in the engine map 135.

The internal friction of the idling engine 105 may be further estimated based on a set of engine parameters 125. The engine parameters 125 may include engine design, engine speed, indicated torque, oil temperature, oil quality, time interval since last oil change, age of engine components, initial break-in, and/or the like. Engine friction estimation may be based on calculating the current rate of decreasing engine speed 315 while the transmission is in neutral and the fuel is cut off.

An engine map 135 may be a prefilled engine map. A prefilled engine map may store the correlation of idle fueling rate difference between the current rate of decreasing engine speed 315 and the reference rate of decreasing engine speed 320 and the amount of correction to the ideal idle speed. The prefilled engine map may also store friction loss as a range of percentages of total fuel energy under idle. This prefilled engine map may be used to estimate engine friction difference from a reference engine friction. Additionally, reference idle speeds and fueling rates may be stored in prefilled engine maps. Prefilled engine maps may include idle fueling information and may be used to correct the engine map 135 under wide engine operating conditions.

The engine map 135 may store the reference rate of decreasing engine speed 320. The reference rate of decreasing engine speed 320 stored in the engine map 135 may be updated. The reference rate of decreasing engine speed 320 stored in the engine map 135 may be updated to correspond to the adjusted predetermined minimum speed. The reference rate of decreasing engine speed 320 stored in the engine map 135 may be updated in response to satisfying the threshold. The reference rate of decreasing engine speed 320 may be based on the set of engine parameters 125 and/or the internal friction of the idling engine 105. The internal friction of the idling engine 105 may be stored in the engine map 135. The internal friction of the idling engine 105 stored in the engine map 135 may be updated in response to estimating the internal friction of the idling engine 105 based on the set of engine parameters 125. The engine map 135 may also include information relating to a set of engine parameters 125 and an internal friction of the idling engine 105.

Figure 4:
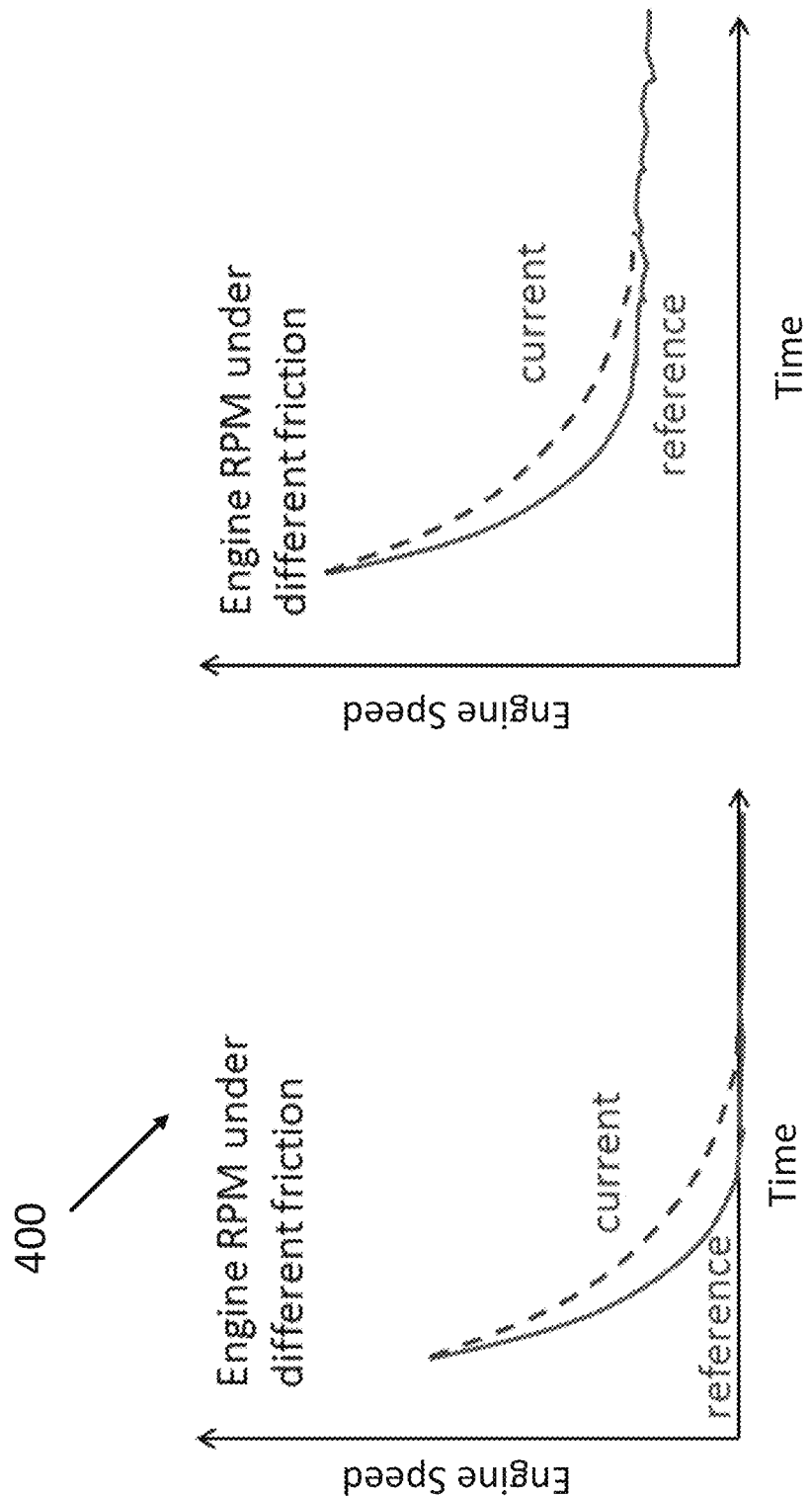
FIG. 4A depicts a diagram of an example in which a rate of decreasing engine speed over time is less than a reference rate of decreasing engine speed over time as the engine speed approaches zero.
FIG. 4B depicts a diagram of an example in which a rate of decreasing engine speed over time is less than a reference rate of decreasing engine speed over time as the engine speed approaches an idling speed.

FIG. 4A depicts a diagram of an example in which a rate of decreasing engine speed over time is less than a reference rate of decreasing engine speed over time as the engine speed approaches zero. Low internal friction is indicated by the current rate of decreasing engine speed 315 being less than the reference rate of decreasing engine speed 320. The target idle speed is adjusted to a lower level accordingly to save fuel. That is, the predetermined minimum speed to prevent stalling is adjusted to a lower level accordingly to save fuel. When internal friction changes, the fuel intake rate 115 needed to maintain the predetermined minimum speed changes too. The amount of correction to idle speed or friction torque can be determined from the engine map 135.

FIG. 4B depicts a diagram of an example in which a rate of decreasing engine speed over time is less than a reference rate of decreasing engine speed over time as the engine speed approaches an idling speed. Low internal friction is indicated by the current rate of decreasing engine speed 315 being less than the reference rate of decreasing engine speed 320. The target idle speed is adjusted to a lower level accordingly to save fuel. That is, the predetermined minimum speed to prevent stalling is adjusted to a lower level accordingly to save fuel. When internal friction changes, the fuel intake rate 115 needed to maintain the predetermined minimum speed changes too. The amount of correction to idle speed or friction torque can be determined from the engine map 135.

Figure 5:
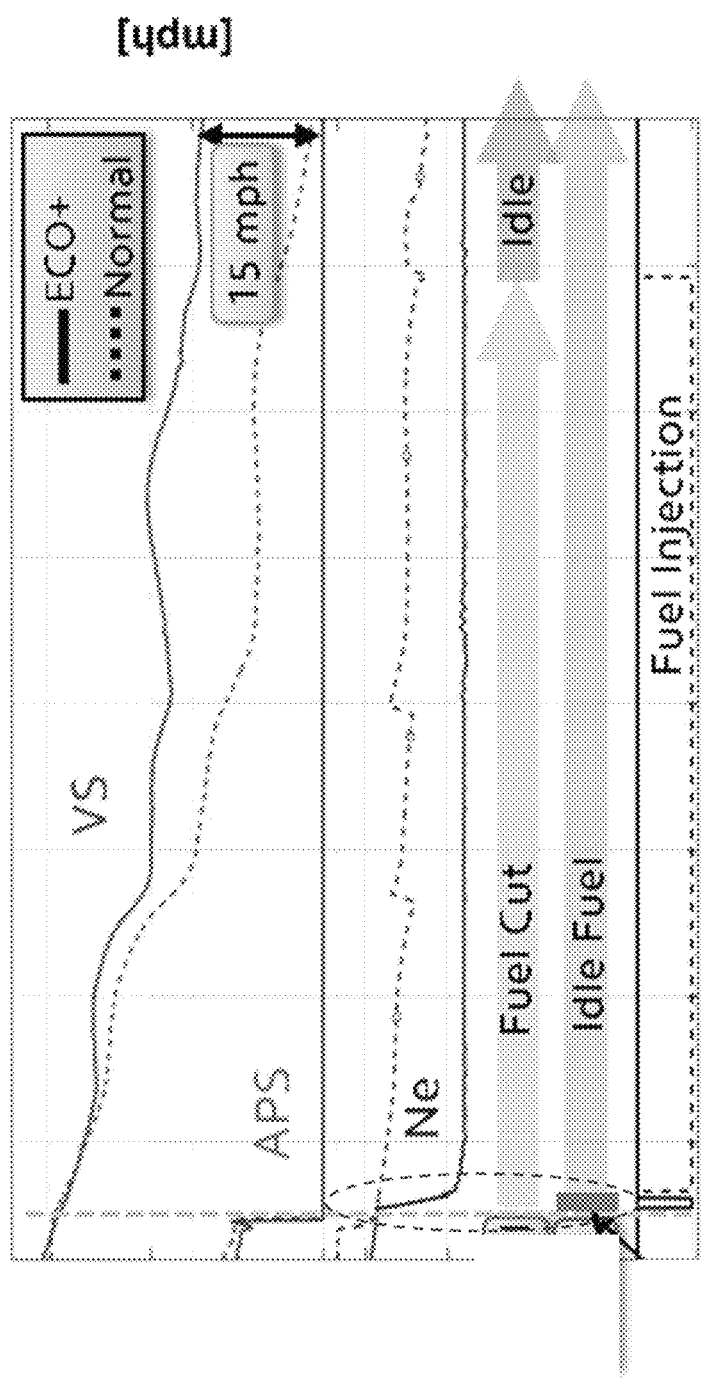
FIG. 5 depicts a diagram illustrating an example of a window of time in which the comparison of the current rate of decreasing engine speed and the reference rate of decreasing engine speed may be performed during engine idle coasting.

FIG. 5 depicts a diagram illustrating an example of a window of time in which the comparison of the current rate of decreasing engine speed and the reference rate of decreasing engine speed may be performed during engine idle coasting. During engine idle coasting, the driver releases the accelerator and, before the engine goes to idle, the transmission is shifted to neutral and the fuel is cut off. Engine speed decreases until it reaches idle speed and fuel is then resupplied to maintain the idle speed. That is, the engine speed decreases under engine friction without any power input until the engine speed is idle.

Figure 6:
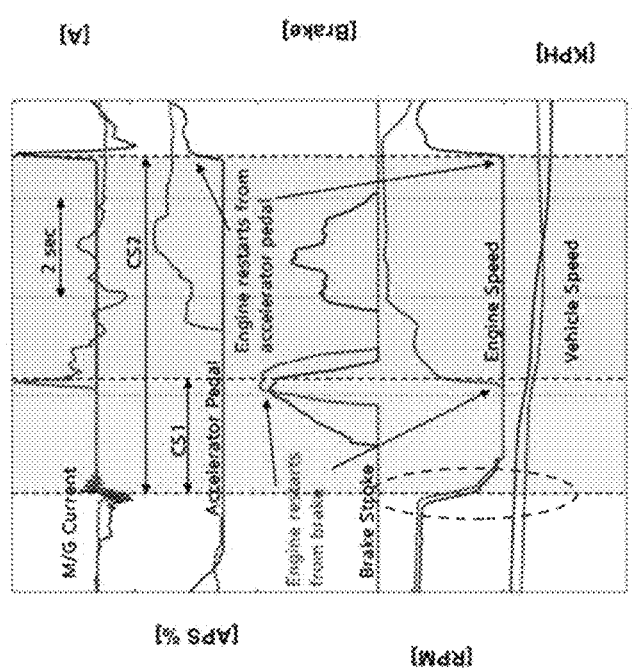
FIG. 6 depicts a diagram illustrating another example of a window of time in which the comparison of the current rate of decreasing engine speed and the reference rate of decreasing engine speed may be performed during engine-off coasting.

FIG. 6 depicts a diagram illustrating another example of a window of time in which the comparison of the current rate of decreasing engine speed and the reference rate of decreasing engine speed may be performed during engine-off coasting. During engine-off coasting, the driver releases the accelerator and, before the engine is turned off, the transmission is shifted to neutral and the fuel is cut off. Engine speed decreases until it reaches zero. That is, the engine speed decreases under engine friction without any power input until the engine speed is zero.

Figure 7:
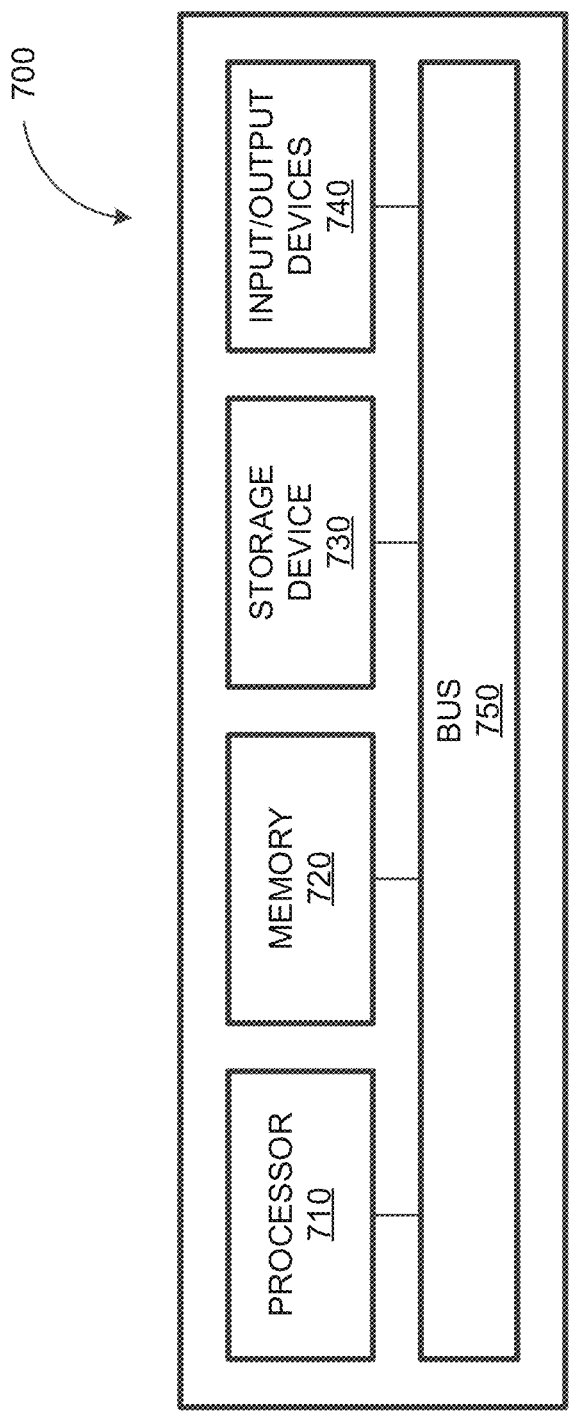
FIG. 7 depicts a block diagram illustrating a computing system 700 consistent with implementations of the current subject matter.

FIG. 7 depicts a block diagram illustrating a computing system 700 consistent with implementations of the current subject matter. Referring to FIGS. 1-7, the computing system 700 can be used to adjust a predetermined minimum speed at which the engine idles. For example, the computing system 700 may implement a user equipment, a personal computer, or a mobile device.

As shown in FIG. 7, the computing system 700 can include a processor 710, a memory 720, a storage device 730, and an input/output device 740. The processor 710, the memory 720, the storage device 730, and the input/output device 740 can be interconnected via a system bus 750. The processor 710 is capable of processing instructions for execution within the computing system 700. Such executed instructions can implement one or more components of, for example, cross-cloud code detection. In some example embodiments, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer-readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some example embodiments, the input/output device 740 includes a keyboard and/or pointing device. In various implementations, the input/output device 740 includes a display unit for displaying graphical user interfaces.

According to some example embodiments, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 700 can be used to execute various interactive computer software applications that can be used for organization, analysis and/or storage of data in various formats. Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 740. The user interface can be generated and presented to a user by the computing system 700 (e.g., on a computer screen monitor, etc.).

The technical advantages presented herein may result in reduced fuel consumption and fuel economy improvement due to lower engine idle speed. Additionally, updated engine maps and engine friction maps improve the engine torque prediction and drivability by delivering the appropriate amount of power to the vehicle. In many cases, no additional hardware is necessary to carry out the technical embodiments described herein, resulting in fewer costs.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A system comprising:
a processor;
a non-transitory computer-readable storage medium storing instructions that, when executed by the processor, cause the processor to perform operations comprising:
determining whether a fuel intake rate indicative of an amount of fuel consumed by an idling engine over time satisfies a threshold in comparison to a reference fuel intake rate, the reference fuel intake rate indicative of a predetermined amount of fuel consumed by the idling engine over time; and
in response to determining that the fuel intake rate satisfies the threshold, adjusting a predetermined minimum speed at which the engine idles.

2. The system of claim 1, wherein the reference fuel intake rate corresponds to the predetermined minimum speed at which the engine idles to at least prevent the idling engine from stalling, the fuel intake rate corresponds to a speed at which the engine idles, and the speed at which the engine idles is determined by a crankshaft position sensor communicatively coupled to the processor.

3. The system of claim 1, wherein the idling engine is isolated from all external load factors, and wherein the adjusting of the predetermined minimum speed at which the engine idles is based on a difference between the fuel intake rate and the reference fuel intake rate.

4. The system of claim 1, wherein the reference fuel intake rate is stored in an engine map, the engine map including information relating to a set of engine parameters and an internal friction of the idling engine.

5. The system of claim 4, wherein the operations further comprise:
updating the reference fuel intake rate stored in the engine map that corresponds to the adjusted predetermined minimum speed,
wherein the reference fuel intake rate is based on the set of engine parameters, and the internal friction of the idling engine.

6. The system of claim 1, wherein the operations further comprise:

estimating, in response to determining that the fuel intake rate satisfies the threshold, an internal friction of the idling engine based on a set of engine parameters; and adjusting the predetermined minimum speed at which the engine idles based on the estimated internal friction of the idling engine.

7. The system of claim 6, wherein the set of engine parameters includes at least one of oil temperature, oil quality, age of engine components, time since engine break in, torque, engine design, and engine speed.

8. The system of claim 6, wherein the internal friction of the idling engine is stored in an engine map, and wherein estimating the internal friction of the idling engine is further based on a difference between the fuel intake rate and the reference fuel intake rate.

9. The system of claim 8, wherein the operations further comprise:

updating, in response to estimating the internal friction of the idling engine based on the set of engine parameters, the internal friction of the idling engine stored in the engine map.

10. A system comprising:

a processor;

a non-transitory computer-readable storage medium storing instructions that, when executed by the processor, cause the processor to perform operations comprising:

determining, in response to cutting fuel to an engine and the engine being isolated from a drivetrain load, whether a rate of decreasing engine speed over time satisfies a threshold in comparison to a reference rate of decreasing engine speed over time; and in response to determining that the rate of decreasing engine speed over time satisfies the threshold, adjusting a predetermined minimum speed at which the engine idles to prevent the engine from stalling.

11. The system of claim 10, wherein the reference rate of decreasing engine speed over time is based on a time interval necessary for the engine to reach an engine speed of zero, the time interval measured from cutting the fuel to the engine and the engine being isolated from the drivetrain load to the engine speed reaching zero.

12. The system of claim 10, wherein the reference rate of decreasing engine speed over time is based on a time interval necessary for the engine to reach the predetermined minimum speed at which the engine idles, the time interval measured from cutting the fuel to the engine and the engine being isolated from the drivetrain load to an engine speed reaching the predetermined minimum speed at which the engine idles.

13. The system of claim 10, wherein the rate of decreasing engine speed over time is determined by a crankshaft position sensor communicatively coupled to the processor, and wherein the adjusting the predetermined minimum speed at which the engine idles is based on a difference between the rate of decreasing engine speed over time and the reference rate of decreasing engine speed over time.

14. The system of claim 10, wherein the reference rate of decreasing engine speed over time is stored in an engine map, the engine map including information relating to a set of engine parameters and an internal friction of the engine.

15. The system of claim 14, wherein the operations further comprise:

updating the reference rate of decreasing engine speed over time stored in the engine map that corresponds to the adjusted predetermined minimum speed, wherein the reference rate of decreasing engine speed over time is based on the set of engine parameters, and the internal friction of the engine.

16. The system of claim 10, wherein the operations further comprise:

estimating, in response to determining that the rate of decreasing engine speed over time satisfies the threshold, an internal friction of the engine based on a set of engine parameters; and adjusting the predetermined minimum speed at which the engine idles based on the estimated internal friction of the engine.

17. The system of claim 16, wherein the set of engine parameters includes at least one of oil temperature, oil quality, age of engine components, time since engine break in, torque, engine design, and engine speed.

18. The system of claim 16, wherein the internal friction of the engine is stored in an engine map, and wherein estimating the internal friction of the engine is further based on a difference between the rate of decreasing engine speed over time and the reference rate of decreasing engine speed over time.

19. The system of claim 18, wherein the operations further comprise:

updating, in response to estimating the internal friction of the engine based on the set of engine parameters, the internal friction of the engine stored in the engine map.

20. A non-transitory computer-readable medium comprising instructions which, when executed by at least one processor, cause operations comprising:

determining whether a fuel intake rate indicative of an amount of fuel consumed by an idling engine over time satisfies a threshold in comparison to a reference fuel intake rate, the reference fuel intake rate indicative of a predetermined amount of fuel consumed by the idling engine over time; and in response to determining that the fuel intake rate satisfies the threshold, adjusting a predetermined minimum speed at which the engine idles.

* * * * *